(12) United States Patent
Tomich et al.

(10) Patent No.: US 8,040,273 B2
(45) Date of Patent: Oct. 18, 2011

(54) RADAR FOR IMAGING OF BUILDINGS

(75) Inventors: John L. Tomich, Coppell, TX (US);
Raymond Samaniego, Plano, TX (US);
Jerry M. Grimm, Plano, TX (US)

(73) Assignee: Raytheon Company, Waltham, MA (US)

( * ) Notice: Subject to any disclaimer, the term of this patent is extended or adjusted under 35 U.S.C. 154(b) by 171 days.

(21) Appl. No.: 12/502,325

(22) Filed: Jul. 14, 2009

(65) Prior Publication Data

US 2011/0012777 A1   Jan. 20, 2011

(51) Int. Cl.
*G01S 13/89* (2006.01)
*G01S 13/90* (2006.01)
*G01S 13/00* (2006.01)

(52) U.S. Cl. ....... 342/22; 342/25 R; 342/25 A; 342/175; 342/176; 342/179; 342/190; 342/191; 342/195

(58) Field of Classification Search ............ 342/21, 342/22, 25 R–25 F, 175, 176, 179, 192–197, 342/118, 128–145, 147, 156–158, 127, 190, 342/191
See application file for complete search history.

(56) References Cited

U.S. PATENT DOCUMENTS

| | | | | |
|---|---|---|---|---|
| 2,077,707 A * | 4/1937 | Melton | ............................ | 342/22 |
| 3,351,936 A * | 11/1967 | Feder | .............................. | 342/22 |
| 3,665,466 A * | 5/1972 | Hibbard | ......................... | 342/22 |
| 3,909,827 A * | 9/1975 | Tricoles et al. | ................ | 342/179 |
| 3,916,407 A * | 10/1975 | Bosc et al. | ..................... | 342/196 |
| 4,062,010 A * | 12/1977 | Young et al. | .................... | 342/21 |
| 4,504,833 A * | 3/1985 | Fowler et al. | ................... | 342/22 |
| 4,698,634 A * | 10/1987 | Alongi et al. | ................... | 342/22 |
| 4,706,031 A * | 11/1987 | Michiguchi et al. | ............ | 342/22 |
| 5,130,711 A * | 7/1992 | Kimura et al. | ................... | 342/22 |
| 5,160,931 A | 11/1992 | Brown | | |
| 5,170,171 A * | 12/1992 | Brown | ........................ | 342/25 C |
| 5,192,953 A * | 3/1993 | Tomita | ............................ | 342/22 |
| 5,227,799 A * | 7/1993 | Kimura et al. | ................... | 342/22 |
| 5,287,740 A * | 2/1994 | Tomita | ............................ | 342/22 |
| 5,339,080 A * | 8/1994 | Steinway et al. | ............... | 342/22 |
| 5,463,397 A | 10/1995 | Frankot | | |
| 5,592,170 A * | 1/1997 | Price et al. | ...................... | 342/22 |
| 5,673,050 A * | 9/1997 | Moussally et al. | .............. | 342/22 |
| 5,677,693 A * | 10/1997 | Frankot et al. | ............. | 342/25 C |
| 5,796,363 A * | 8/1998 | Mast | .............................. | 342/22 |
| 5,835,054 A * | 11/1998 | Warhus et al. | .................. | 342/22 |
| 5,886,662 A * | 3/1999 | Johnson | ..................... | 342/25 A |
| 5,900,833 A * | 5/1999 | Sunlin et al. | .................... | 342/22 |
| 5,904,210 A * | 5/1999 | Stump et al. | .................... | 342/22 |
| 5,920,285 A * | 7/1999 | Benjamin | ........................ | 342/22 |
| 6,002,357 A * | 12/1999 | Redfern et al. | ................. | 342/22 |
| 6,130,641 A * | 10/2000 | Kraeutner et al. | ............ | 342/179 |
| 6,188,348 B1 * | 2/2001 | Raney | .............................. | 342/22 |
| 6,522,284 B2 * | 2/2003 | Miceli et al. | .................... | 342/22 |

(Continued)

*Primary Examiner* — Bernarr Gregory
(74) *Attorney, Agent, or Firm* — Baker Botts L.L.P.

(57) ABSTRACT

According to one embodiment, a radar includes multiple antenna elements coupled to an image processing application. The antenna elements have a differing vertical spatial separation relative to one another and are configured to transmit a radio-frequency signal toward a stationary object and receive multiple reflected radio-frequency signals from one or more internal features of the building. The image processing application receives the reflected radio-frequency signals as the antenna elements are moved horizontally with respect to the stationary object. From these reflected radio-frequency signals, the image processing application generates imagery of the stationary object according to phase variations in the plurality of received radio-frequency signals. The imagery depicting vertical characteristics of the one or more internal features of the building.

20 Claims, 2 Drawing Sheets

U.S. PATENT DOCUMENTS

| | | | |
|---|---|---|---|
| 6,590,519 B2 * | 7/2003 | Miceli et al. | 342/22 |
| 6,621,448 B1 * | 9/2003 | Lasky et al. | 342/22 |
| 6,701,647 B2 * | 3/2004 | Stump | 342/22 |
| 6,727,841 B1 * | 4/2004 | Mitra | 342/25 R |
| 6,784,826 B2 | 8/2004 | Kane et al. | |
| 6,894,637 B2 * | 5/2005 | Moreira et al. | 342/22 |
| 6,911,931 B2 * | 6/2005 | Vincent | 342/25 C |
| 6,914,553 B1 * | 7/2005 | Beadle et al. | 342/25 R |
| 6,919,839 B1 * | 7/2005 | Beadle et al. | 342/25 R |
| 6,982,666 B2 | 1/2006 | Temes et al. | |
| 7,064,702 B1 | 6/2006 | Abatzoglou | |
| 7,173,560 B2 * | 2/2007 | Li et al. | 342/22 |
| 7,307,575 B2 * | 12/2007 | Zemany | 342/22 |
| 7,312,742 B2 * | 12/2007 | Steinway et al. | 342/22 |
| 7,339,516 B2 * | 3/2008 | Thompson et al. | 342/22 |
| 7,345,618 B1 * | 3/2008 | Cole et al. | 342/22 |
| 7,355,545 B2 * | 4/2008 | Zemany et al. | 342/22 |
| 7,391,362 B2 | 6/2008 | Beckner | |
| 7,436,348 B2 | 10/2008 | Nohmi | |
| 7,460,052 B2 * | 12/2008 | Zemany et al. | 342/22 |
| 7,460,053 B2 * | 12/2008 | Zemany et al. | 342/22 |
| 7,508,334 B2 | 3/2009 | Allen et al. | |
| 7,511,655 B2 | 3/2009 | Willey et al. | |
| 7,528,762 B2 * | 5/2009 | Cerwin | 342/22 |
| 7,528,764 B2 * | 5/2009 | Zemany et al. | 342/22 |
| 7,561,096 B2 * | 7/2009 | Hellsten | 342/22 |
| 2004/0004569 A1 | 1/2004 | Lam | |
| 2006/0164288 A1 | 7/2006 | Voelker | |
| 2008/0231504 A1 | 9/2008 | Sartor et al. | |

* cited by examiner

RADAR FOR IMAGING OF BUILDINGS

GOVERNMENT RIGHTS

This invention was made with government support under government contract number HR0011-06-C-0111, Visi-Building Phase I. The Government has certain rights in this invention.

TECHNICAL FIELD OF THE DISCLOSURE

This disclosure generally relates to synthetic aperture radars, and more particularly, to an interferometric synthetic aperture radar that may be used for generating imagery of buildings.

BACKGROUND OF THE DISCLOSURE

Synthetic aperture radars (SARs) generate imagery by processing radio-frequency energy reflected from differing orientations and positions relative to the target. Imagery generated by synthetic aperture radars may have benefits over other image generating devices such as cameras in that imagery generated by synthetic aperture radars is not usually hampered by precipitation, fog, or other atmospheric phenomena that warps or blocks visible light. In some cases, synthetic aperture radars may be used to gather imagery of various internal features of objects that may be normally opaque to visible light.

SUMMARY OF THE DISCLOSURE

According to one embodiment, a synthetic aperture radar includes multiple antenna elements coupled to an image processing application. The antenna elements have a differing vertical spatial separation relative to one another and are configured to transmit a radio-frequency signal toward a stationary object and receive multiple reflected radio-frequency signals from one or more internal features of the building. The image processing application receives the reflected radio-frequency signals as the antenna elements are moved horizontally with respect to the stationary object. From these reflected radio-frequency signals, the image processing application generates imagery of the stationary object according to phase variations in the plurality of received radio-frequency signals. The imagery depicting vertical characteristics of the one or more internal features of the building.

Some embodiments of the disclosure may provide numerous technical advantages. For example, one embodiment of the synthetic aperture radar may generate imagery of stationary objects such as multi-floor buildings with improved filtering of each floor. The synthetic aperture radar has multiple antenna elements with a differing vertical spatial separation relative to one another for deriving various vertical characteristics of a building such as walls or people that may be on either floor. The vertical spatial separation provides receipt of reflected radio-frequency signals with a phase shift associated with the relative elevation of objects within the building. The image processing application, therefore, may generate imagery depicting specific objects present on each floor of the building.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Imagery generated by synthetic aperture radars (SARs) may have certain benefits over other image generating devices such as photographic or video cameras that process visible light from a target. For example, synthetic aperture radars may be used to gather imagery of internal features of targets that may be shielded from view by photographic or video cameras. For this reason, synthetic aperture radars may be useful in intelligence, surveillance, and reconnaissance (ISR) activities to reveal information about targets that may be generally hidden from view by the naked eye.

Due to terrorist warfare tactics, the United States Department of Defense (DoD) has determined that a useful purpose exists for imagery generated by synthetic aperture radars. Whereas conventional warfare has been conducted on a relatively large scale, terrorism, however, may be limited to the movements and actions of only one or several enemy combatants. For example, it may be useful to observe the movements of terrorists while stationed in a building. Known synthetic aperture radar implementations, however, have typically been implemented on relatively large portable platforms such as aircraft or ships, which may not be conducive to tracking terrorists movements through buildings in a small town or neighborhood.

Figure 1:
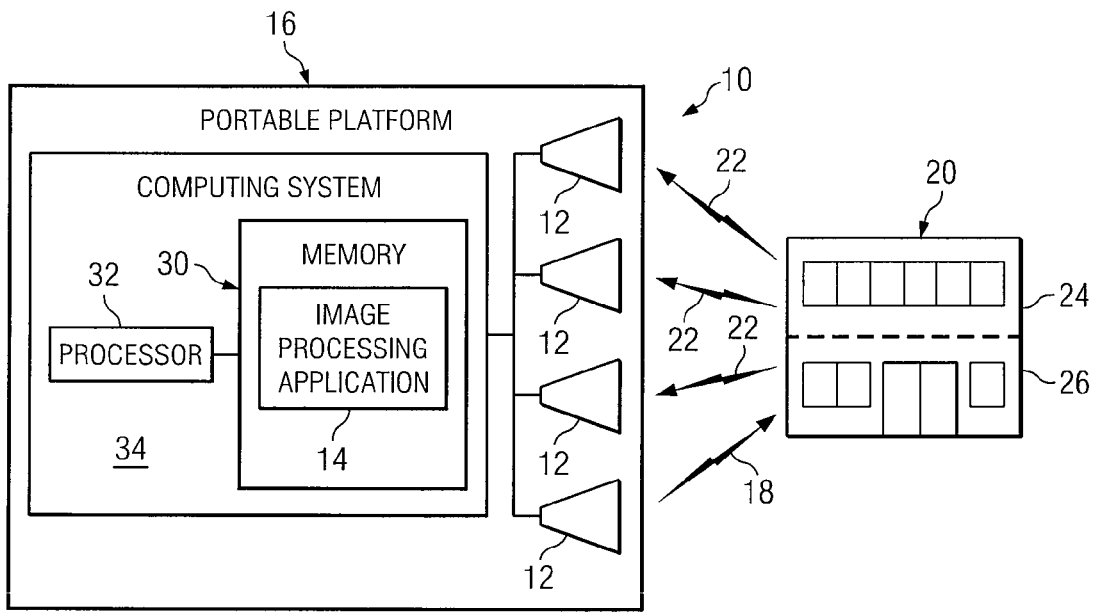
FIG. 1 shows one embodiment of a synthetic aperture radar that may be used to generate imagery of buildings according to the teachings of the present disclosure.

FIG. 1 shows one embodiment of a synthetic aperture radar 10 according to the teachings of the present disclosure. Synthetic aperture radar 10 includes multiple antenna elements 12 coupled to a image processing application 14. Antenna elements 12 have a vertical spatial separation relative to one another. Synthetic aperture radar 10 is configured on a portable platform 16 such that antenna elements 12 may be moved horizontally in relative close proximity to a stationary object such as a building 20. As is described in detail below, antenna elements 12 transmit a radio-frequency signal 18 toward building 20 and receive multiple reflected radio-frequency signals 22 from building 20. Image processing application 14 processes these radio-frequency signals 22 to derive various vertical characteristics of its internal features such as an upper floor 24 of building 20 and differentiate this information from information associated with other internal features of a first floor 26 of building 20.

Computing system 34 includes, in one embodiment, instructions stored in image processing application 14 in memory 30 and executed by a processor 32. Computing system 34 may be a network coupled computing system or a stand-alone computing system. The stand-alone computing system 34 may be any suitable computing system, such as a personal computer, laptop computer, or mainframe computer capable of executing instructions of image processing application 14. The network computing system may be a number of computers coupled together via a network, such as a local area network (LAN), a metropolitan area network (MAN), or a wide area network (WAN). In one embodiment, computing system 34 includes a stand-alone computing system that configured within and derives its electrical power from portable platform 16.

Antenna elements 12 may each be any type of antenna element that coverts electrical signals to electro-magnetic radiation and vice-versa. In one embodiment, antenna elements 12 are broad-band horn antennas that are dimensioned to transmit and receive radio frequency signals in the L-band of operation (500 to 1550 Mega-Hertz (MHz)). Given this range of frequencies, each antenna element 14 may have a length of approximately 1.5 feet and a front aperture of approximately 1.0 foot by 1.0 foot. In one embodiment, transmitted radio-frequency signal 18 is stepped in frequency during operation of synthetic aperture radar 10. Acquisition of reflected radio-frequency signals 22 at various frequencies may yield additional information about various internal characteristics of building 20 due to the differing penetration depths of radio-frequency signal 18 at differing frequencies. In one embodiment, the transmitted radio-frequency signal 18 may be stepped from 600 to 1250 Mega-Hertz (MHz). Radio-frequency signals in this range may be well suited for penetration through buildings formed of common materials such as wood and/or concrete. In another embodiment, transmitted radio-frequency signal 18 is stepped at a rate such that a stepping cycle is performed within every 6 inch movement of portable platform 16.

Inverse synthetic aperture radars typically operate by moving a transmit and receive beam of microwave radiation across a target of interest in a controlled manner. In some cases, the transmit and receive beam may be rotated across the target of interest while multiple signals from the received beam are processed. Techniques used for this mode of movement may include a motorized mechanism that spins its antenna array across a target or an active electronically scanned array (AESA) that scans its transmit and receive beams across the target using the combined radiation pattern of multiple antenna elements. In the present embodiment, antenna elements 12 may have an orientation that remains relatively fixed during acquisition of microwave radiation reflected from building 20. The generally static nature of antenna elements 12 may, therefore, be relatively less complex and smaller in size than other antenna elements configured for use with inverse synthetic aperture radars in some embodiments. Portable platform 16 provides movement of the antenna elements 12 relative to building 20 for generation imagery of its internal characteristics.

Synthetic aperture radar 10 may be operated in the interferometric synthetic aperture radar mode in which a single radio-frequency signal 18 is transmitted by one antenna element 12 and reflected radio-frequency signals 22 are received by the other antenna elements 12. Because the reflected radio-frequency signals 22 originate from a single source, phase information may be analyzed from reflected radio-frequency signals 22 to determine various internal characteristics of building 20. Image processing application 14 may combine this phase information with other attributes of received radio-frequency signals 22 to enhance the generated imagery. In some embodiments, the acquired phase information may be useful for filtering specular reflections of internal features of upper floors 24 from ground floor 26 of building 20.

Image processing application 12 may receive and analyze phase information at each of several frequencies within the frequency range described above. In one embodiment, phase information obtained at each frequency may be combined to form the resulting image. Certain embodiments that combine phase information obtained at various frequencies may enhance the resulting imagery generated by synthetic aperture radar 10. For example, some internal features of building 20 may reflect and/or attenuate differing frequencies of radio-frequency signals 22 at corresponding differing levels. Image processing application 12 may use these differing levels of reflectivity and/or attenuation to enhance the resulting image generated by synthetic aperture radar 10. In one embodiment, image processing application 12 may combine phase information from radio-frequency signals 22 obtained at differing orientations that were obtained by movement of portable platform 16 relative to building 20. That is, acquiring phase information during movement of portable platform 16 within the vicinity of building 20 may provide several sets of phase information that may be combined by image processing application 12 to form the resulting image. In another embodiment, phase information may be obtained at each of several passes of portable platform 16 within the vicinity of building 20 and combined by image processing application 12 to form the resulting image.

Figure 2:
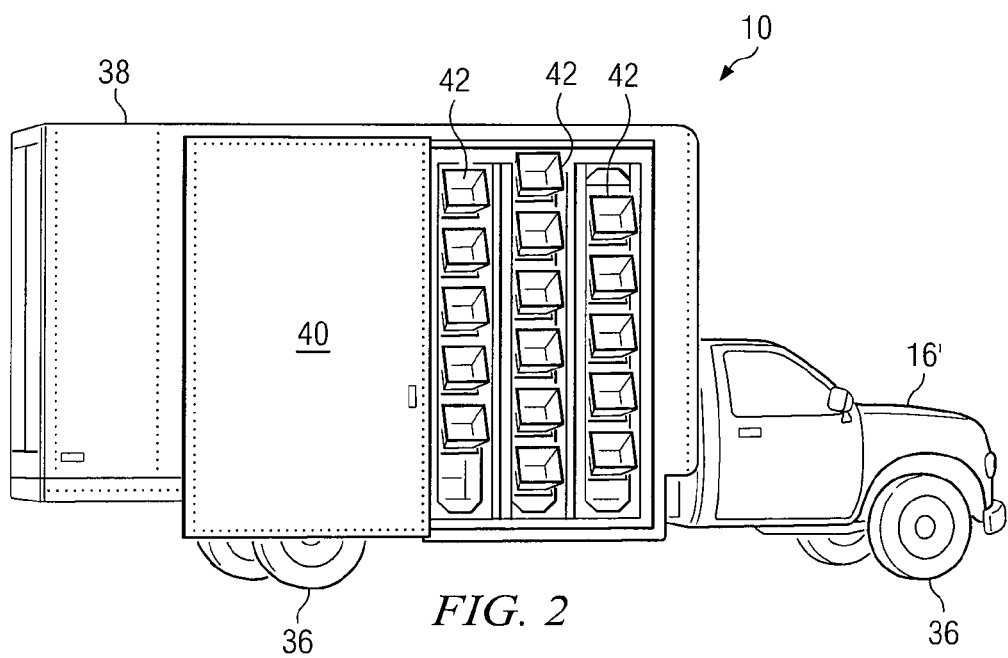
FIG. 2 is an illustration showing one embodiment of a portable platform that in this particular embodiment, is a truck that may be used to house the synthetic aperture radar of FIG. 1.

FIG. 2 is an illustration showing one embodiment of a portable platform, which in this particular illustration, is a truck 16'. Truck 16' is configured to move synthetic aperture radar 10 horizontally over the ground or other suitable horizontal surface such as a roadway. Truck 16' is a known type having wheels 36 for movement over land and an enclosure 38 for housing antenna elements 12 and computing system (not shown) of synthetic aperture radar 10. Enclosure 38 includes a randome 40 that is shown hingedly rotated to an open position to reveal antenna elements 12 configured inside. Although a truck 16' is shown, any type of portable platform 16 may be implemented for use with synthetic aperture radar 10 such as automobiles, tractor trailers, or military vehicles such as armored personnel carriers or tanks.

Portable platforms 16 implemented as land-based vehicles may be well suited for moving synthetic aperture radar 10 horizontally relative to building 20 for generating imagery of internal features of building 20. For example, land-based vehicles such as truck 16' may travel over roads proximate building 20 at relatively close distances relative to other forms of portable platforms 16. In this manner, synthetic aperture radar 10 may provide imagery having relatively good resolution due to specular reflections that may have relatively good differentiation at close ranges. Land-based vehicles such as truck 16' may also provide for covert operation in that antenna elements 12 and computing system 34 (FIG. 1) may be concealed from view within enclosure 38.

In the particular embodiment shown, antenna elements 12 are configured in a two-dimensional array in which they are arranged above and below one another having a vertical spatial separation as well as beside one another along the side of truck 16'. In the particular embodiment shown, three vertically oriented columns 42 are provided that may be independently adjustable relative to the other vertically oriented columns 42. Each vertically oriented column 42 is positioned beside other vertically oriented columns 42 such that certain antenna elements 12 may have a horizontal spatial separation relative to other antenna elements 12. This horizontal spatial separation may provide enhanced resolution of imagery along its horizontal extent in some embodiments. In one embodiment in which antenna elements 12 are operated in an interferometeric synthetic aperture radar mode, the horizontal separation of antenna elements 12 relative to one another may improve regression of specular reflections from features within building 20 due to angular variations of received radio-frequency signals received by horizontally separated antenna elements 12.

Modifications, additions, or omissions may be made to synthetic aperture radar 10 without departing from the scope of the disclosure. The components of synthetic aperture radar 10 may be integrated or separated. For example, computing system 34 may be configured within portable platform 16 or may be configured external to portable platform 16 in which image processing application 14 processes signals from antenna elements 12 using telemetry signaling techniques. Moreover, the operations of synthetic aperture radar 10 may be performed by more, fewer, or other components. For example, synthetic aperture radar 10 may include other devices useful for its operation, such as video cameras that may be used by image processing application 14 for aligning the derived imagery with other elements on the outside of building 20. Additionally, operations of computing system 22 may be performed using any suitable logic comprising software, hardware, and/or other logic.

Figure 3:
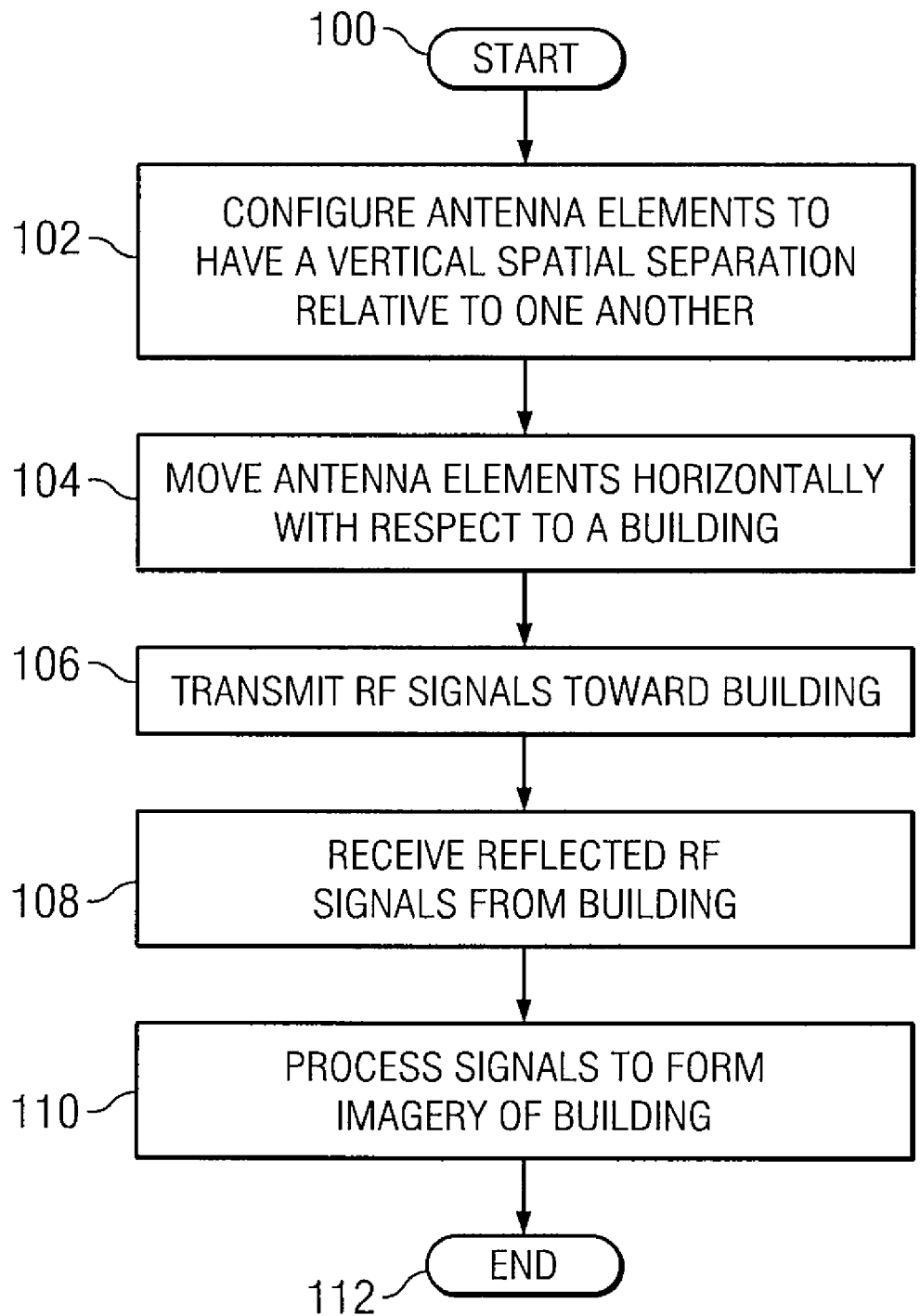
FIG. 3 is a flowchart showing one embodiment of a series of actions that may be performed by the synthetic aperture radar of FIG. 1 to acquire imagery of a building.

FIG. 3 is a flowchart showing one embodiment of a series of actions that may be performed by synthetic aperture radar 10 to acquire imagery of a stationary object such as building 20. In act 100, the process is initiated.

In act 102, antenna elements 12 are provided having a vertical spatial separation relative to one another. Antenna elements 12 may have varying elevational orientations relative to one another to enhance specular reflections from differing vertical angles of building 20. In one embodiment, antenna elements 12 may be configured in a two-dimensional array in which certain antenna elements also have a horizontal spatial separation relative to certain other antenna elements 12.

In act 104, synthetic aperture radar 10 is moved horizontally with respect to building 20. Horizontal movement of synthetic aperture radar 10 may be provided by a truck 16' that moves over a roadway in relatively close proximity to building 20.

In act 106, antenna elements 12 of synthetic aperture radar 10 transmit one or more radio-frequency signals 18 toward building 20. In one embodiment, a single radio-frequency signal may be transmitted by an antenna element 12 such that image processing application 14 may process reflected radio-frequency signals 22 from the other antenna elements 12 in the interferometric synthetic aperture radar mode. The transmitted radio-frequency signal 18 may be stepped over a frequency range. The transmitted radio-frequency is stepped at a rate to complete a stepping cycle within every 6 inch movement of truck 16'.

In act 108, antenna elements 12 of synthetic aperture radar 10 receive multiple radio-frequency signals 22 reflected from building 20. The vertical spatial separation and/or horizontal spatial separation of antenna elements relative to one another may include information about various internal characteristics of building 20 that may reveal certain internal characteristics of building 20, such as the existence and orientation of walls of people in building 20.

In act 110, image processing application 14 processes the received radio-frequency signals 22 to form imagery of building 20. The vertical spatial separation of antenna elements 12 provides radio-frequency signals 22 that may be used to distinguish various vertical characteristics within building 20. For example, phase variations caused by specular reflections from upper floors of building 20 may be used as a filter for imagery generated for the ground floor of building 20 and vice-versa. Thus, imagery of the internal characteristics of building 20 may be obtained for buildings 20 having multiple floors.

The process describes above continues throughout acquisition of imagery of building 20. When further acquisition of imagery is no longer needed or desired, the process ends in act 112.

Modifications, additions, or omissions may be made to the method without departing from the scope of the disclosure. The method may include more, fewer, or other acts. For example, the above described series of actions may be performed multiple times over the same pathway or over differing pathways and the resulting imagery of each combined to form enhanced imagery of building 20. Additionally, information associated with movement of people or other things in building 20 may be monitored by comparing imagery that is acquired at varying times relative to one another.

Although the present disclosure has been described with several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

What is claimed is:

1. A mobile synthetic aperture radar comprising:
a plurality of antenna elements that are arranged in a two-dimensional array and configured in or on a truck, the plurality of antenna elements operable to transmit a transmitted radio-frequency signal toward a building and receive a plurality of reflected radio-frequency signals comprising energy from the transmitted radio-frequency signal that is reflected from one or more internal features of the building, the plurality of antenna elements operable to step the transmitted radio-frequency signal through a range of frequencies extending from 500 to 1225 Mega-Hertz, at least a portion of the reflected radio-frequency signals received with a vertical aperture that differs from one another; and
an image processing application coupled to the plurality of antenna elements and operable to:
receive the reflected radio-frequency signals from the plurality of antenna elements as they are moved horizontally with respect to the building; and
generate imagery of the building according to phase variations in the plurality of received radio-frequency signals relative to one another, the imagery depicting vertical characteristics of the one or more internal features comprising a ground floor and an upper floor of the building.

2. A mobile synthetic aperture radar comprising:
a plurality of antenna elements having a differing vertical spatial separation relative to one another, the plurality of antenna elements operable to transmit a transmitted radio-frequency signal toward a stationary object and receive a plurality of reflected radio-frequency signals comprising energy from the transmitted radio-frequency signal that is reflected from one or more internal features of the stationary object; and
an image processing application coupled to the plurality of antenna elements and operable to:
receive the reflected radio-frequency signals from the plurality of antenna elements as they are moved horizontally with respect to the stationary object; and
generate imagery of the stationary object according to phase variations in the plurality of received radio-frequency signals relative to one another, the imagery depicting vertical characteristics of the one or more internal features.

3. The mobile synthetic aperture radar of claim 2, wherein the plurality of antenna elements comprise a two-dimensional array of antenna elements.

4. The mobile synthetic aperture radar of claim 2, wherein the plurality of antenna elements are operable to step the transmitted radio-frequency signal through a range of frequencies.

5. The mobile synthetic aperture radar of claim 4, wherein the range of frequencies extends from 500 Mega-Hertz to 1225 Mega-Hertz.

6. The mobile synthetic aperture radar of claim 4, wherein the plurality of antenna elements are operable to repeatedly step the transmitted radio-frequency signals through the range of frequencies within every 6 inch movement of the plurality of antenna elements.

7. The mobile synthetic aperture radar of claim 2, wherein the stationary object comprises a building and the one or more internal features comprises a ground floor and an upper floor of the building.

8. The mobile synthetic aperture radar of claim 2, wherein the plurality of antenna elements are configured on a portable platform.

9. The mobile synthetic aperture radar of claim 8, wherein the portable platform comprises a land-based vehicle.

10. The mobile synthetic aperture radar of claim 2, wherein the plurality of antenna elements are oriented in a fixed orientation relative to one another.

11. The mobile synthetic aperture radar of claim 2, wherein the plurality of antenna elements are operable to receive at least a portion of the reflected radio-frequency signals with a vertical aperture that differs from one another.

12. A method comprising:
providing a plurality of antenna elements that have a vertical spatial separation relative to one another;
moving the plurality of antenna elements horizontally with respect to a stationary object;
transmitting, using the plurality of antenna elements, a transmitted radio-frequency signal toward the stationary object;
receiving, using the plurality of antenna elements, a plurality of reflected radio-frequency signals comprising energy from the transmitted radio-frequency signal that is reflected from one or more internal features of the stationary object; and
generating imagery of the stationary object according to phase variations in the plurality of received radio-frequency signals relative to one another, the imagery depicting vertical characteristics of the one or more internal features.

13. The method of claim 12, further comprising orienting the plurality of antenna elements to have a horizontal spatial separation relative to one another.

14. The method of claim 12, wherein transmitting the transmitted radio-frequency signal comprises stepping the transmitted radio-frequency signal through a range of frequencies.

15. The method of claim 14, wherein stepping the transmitted radio-frequency signal comprises stepping the transmitted radio-frequency signal through a range of frequencies that extends from 500 Mega-Hertz to 1225 Mega-Hertz.

16. The method of claim 15, wherein stepping the transmitted radio-frequency signal comprises repeatedly stepping the transmitted radio-frequency signals through the range of frequencies within every 6 inch movement of the plurality of antenna elements.

17. The method of claim 12, wherein generating imagery of one or more internal features of the stationary object comprises generating imagery of a ground floor and one or more upper floors of a building.

18. The method of claim 12, wherein moving the plurality of antenna elements horizontally with respect to the building comprises moving the plurality of antenna elements horizontally with respect to a building using a land-based vehicle.

19. The method of claim 12, further comprising orienting the plurality of antenna elements to have a fixed orientation relative to one another.

20. The method of claim 12, wherein receiving the reflected radio-frequency signals comprises receiving at least a portion of the reflected radio-frequency signals with a vertical aperture that differs from one another.

* * * * *